United States Patent [19]
Palmer

[11] Patent Number: 5,642,569
[45] Date of Patent: Jul. 1, 1997

[54] TELESCOPING MEASURING DEVICE

[76] Inventor: Gordon M. Palmer, 2828 Alice Street, Abbotsford, Canada, V2T 3P1

[21] Appl. No.: 537,446

[22] Filed: Oct. 2, 1995

[51] Int. Cl.⁶ ................................................. G01B 3/08
[52] U.S. Cl. ................................................. 33/809
[58] Field of Search ......................... 33/296, 427, 452, 33/464, 767, 809

[56] References Cited

U.S. PATENT DOCUMENTS

| | | | |
|---|---|---|---|
| 149,532 | 4/1874 | Sherwin | 33/809 |
| 1,159,012 | 11/1915 | Gasstrom | 33/809 |
| 2,270,227 | 1/1942 | Swanson et al. | 33/809 |
| 2,336,393 | 12/1943 | Combes | 33/809 |
| 3,328,887 | 7/1967 | Wright | 33/809 |
| 4,180,914 | 1/1980 | Lechner | 33/809 |
| 4,621,431 | 11/1986 | Fatool et al. | 33/809 |
| 4,662,077 | 5/1987 | Richardson | 33/809 |

FOREIGN PATENT DOCUMENTS

| | | | |
|---|---|---|---|
| 1292551 | 3/1962 | France | 33/809 |
| 1116803 | 6/1968 | United Kingdom | 33/809 |

*Primary Examiner*—G. Bradley Bennett

[57] ABSTRACT

A device for measuring a distance between objects. The inventive device includes a first member having a second member telescopingly received therewithin. Measurement indicia is printed on the second member and starts at a known length of the first member to indicate an overall length of the device which can be read at an intersection of the first and second members. The invention may include a detent assembly for securing the second member relative to the first member, and may further include a third member slidably received within the second member for measuring greater lengths.

1 Claim, 4 Drawing Sheets

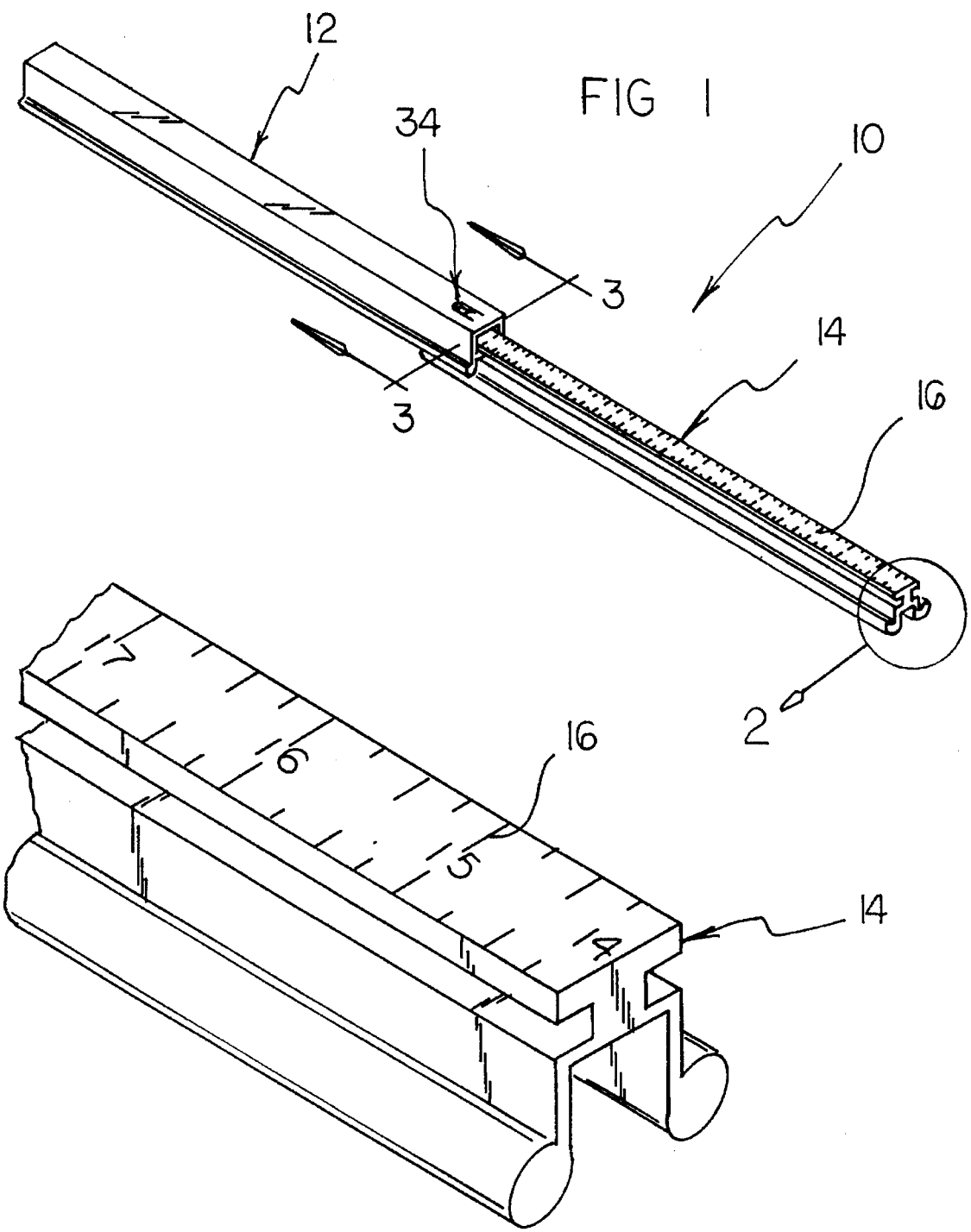

TELESCOPING MEASURING DEVICE

BACKGROUND OF THE INVENTION

1. Field of the Invention

The present invention relates to measuring structures and more particularly pertains to a telescoping measuring device for measuring a distance between objects.

2. Description of the Prior Art

The use of measuring structures is known in the prior art. More specifically, measuring structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art measuring structures include U.S. Pat. No. 4,180,914; U.S. Pat. No. 3,492,737; U.S. Pat. No. 4,621,431; U.S. Pat. No. 4,566,200; U.S. Pat. No. 4,399,616; and U.S. Pat. No. 4,203,227.

While these devices fulfill their respective, particular objectives and requirements, the aforementioned patents do not disclose a telescoping measuring device for measuring a distance between objects which includes a first member having a second member telescopingly receive therewithin, with measurement indicia printed on the second member and starting at a known length of the first member to indicate an overall length of the device at an intersection of the first and second members, wherein the invention may further include a detent assembly for securing the second member relative to the first member, and a third member slidably received within the second member for measuring greater lengths.

In these respects, the telescoping measuring device according to the present invention substantially departs from the conventional concepts and designs of the prior art, and in so doing provides an apparatus primarily developed for the purpose of measuring a distance between objects.

SUMMARY OF THE INVENTION

In view of the foregoing disadvantages inherent in the known types of measuring structures now present in the prior art, the present invention provides a new telescoping measuring device construction wherein the same can be utilized for measuring a distance between objects. As such, the general purpose of the present invention, which will be described subsequently in greater detail, is to provide a new telescoping measuring device apparatus and method which has many of the advantages of the measuring structures mentioned heretofore and many novel features that result in a telescoping measuring device which is not anticipated, rendered obvious, suggested, or even implied by any of the prior art measuring structures, either alone or in any combination thereof.

To attain this, the present invention generally comprises a device for measuring a distance between objects. The inventive device includes a first member having a second member telescopingly received therewithin. Measurement indicia is printed on the second member and starts at a known length of the first member to indicate an overall length of the device which can be read at an intersection of the first and second members. The invention may include a detent assembly for securing the second member relative to the first member, and may further include a third member slidably received within the second member for measuring greater lengths.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telescoping measuring device apparatus and method which has many of the advantages of the measuring structures mentioned heretofore and many novel features that result in a telescoping measuring device which is not anticipated, rendered obvious, suggested, or even implied by any of the prior art tool guides, either alone or in any combination thereof.

It is another object of the present invention to provide a new telescoping measuring device which may be easily and efficiently manufactured and marketed.

It is a further object of the present invention to provide a new telescoping measuring device which is of a durable and reliable construction.

It is a further object of the present invention to provide a new telescoping measuring device that can be utilized by one person, thereby eliminating a need for a second person to hold a free end of a measuring tape as is required in prior art measuring procedures.

An even further object of the present invention is to provide a new telescoping measuring device which is susceptible of a low cost of manufacture with regard to both materials and labor, and which accordingly is then susceptible of low prices of sale to the consuming public, thereby making such telescoping measuring devices economically available to the buying public.

Still yet another object of the present invention is to provide a new telescoping measuring device which provides in the apparatuses and methods of the prior art some of the advantages thereof, while simultaneously overcoming some of the disadvantages normally associated therewith.

Still another object of the present invention is to provide a new telescoping measuring device for measuring a distance between objects.

Yet another object of the present invention is to provide a new telescoping measuring device which includes a first member having a second member telescopingly receive therewithin, with measurement indicia printed on the second member and starting at a known length of the first member to indicate an overall length of the device at an intersection of the first and second members, wherein the invention may further include a detent assembly for securing the second member relative to the first member, and a third member slidably received within the second member for measuring greater lengths.

Another object of the present invention is to provide accurate inside measurement between two objects without a need to add any additional structure therebetween, thereby eliminating or reducing measurement error.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a telescoping measuring device according to the present invention.

FIG. 2 is an enlarged isometric illustration of the area set forth in FIG. 1.

DESCRIPTION OF THE PREFERRED EMBODIMENT

Figure 3:
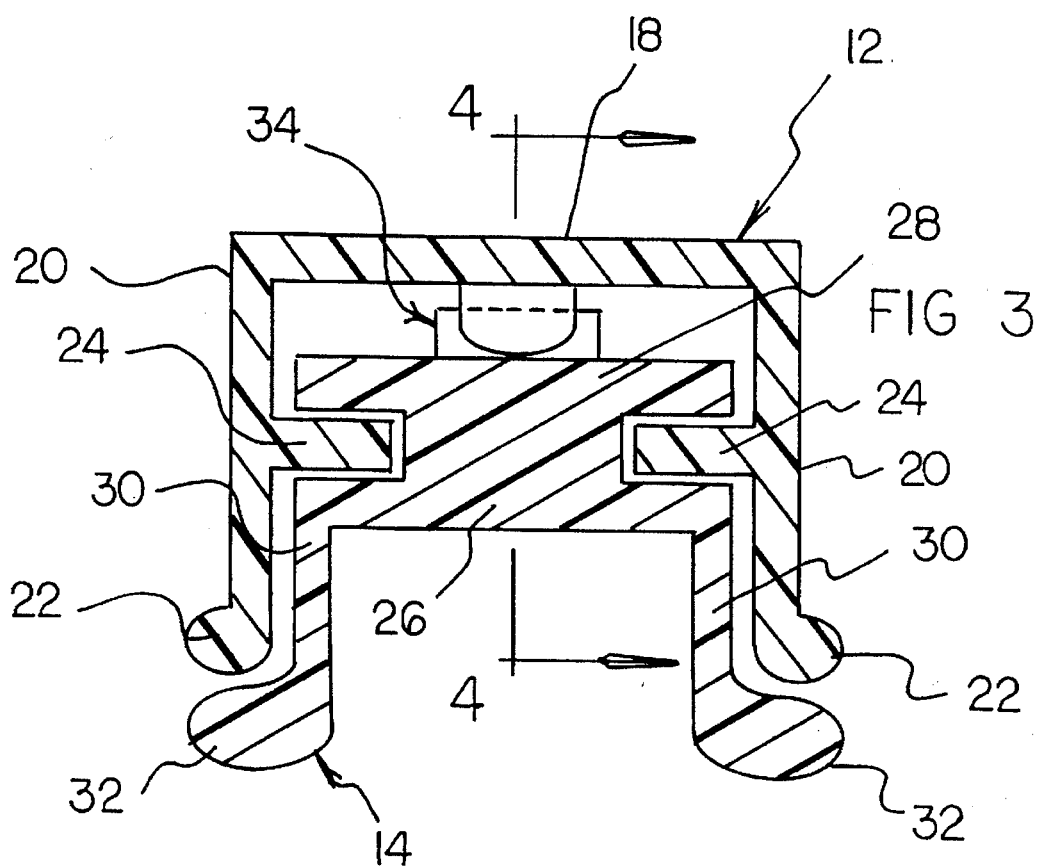
FIG. 3 is a cross sectional view taken along line 3—3 of FIG. 1.

With reference now to the drawings, and in particular to FIGS. 1–8 thereof, a new telescoping measuring device embodying the principles and concepts of the present invention and generally designated by the reference numeral 10 will be described.

More specifically, it will be noted that the telescoping measuring device 10 comprises an elongated first member 12 having an elongated second number 14 slidably received at least partially within the first member substantially as shown in FIG. 1 of the drawings. Measurement indicia 16 is printed along the second member 14 and can be interpreted to indicate an overall length of the device at an intersection of the first and second members so as to indicate a distance between two objects such as framing studs of an unfinished wall structure. Thus, the present invention 10 facilitates ease of measurement between interior surfaces of two spaced objects wherein the second member 14 is simply extended from the first member 12 such that respectively opposed longitudinal ends of the device 10 abut the interior surfaces of the objects to be measured.

Figure 4:
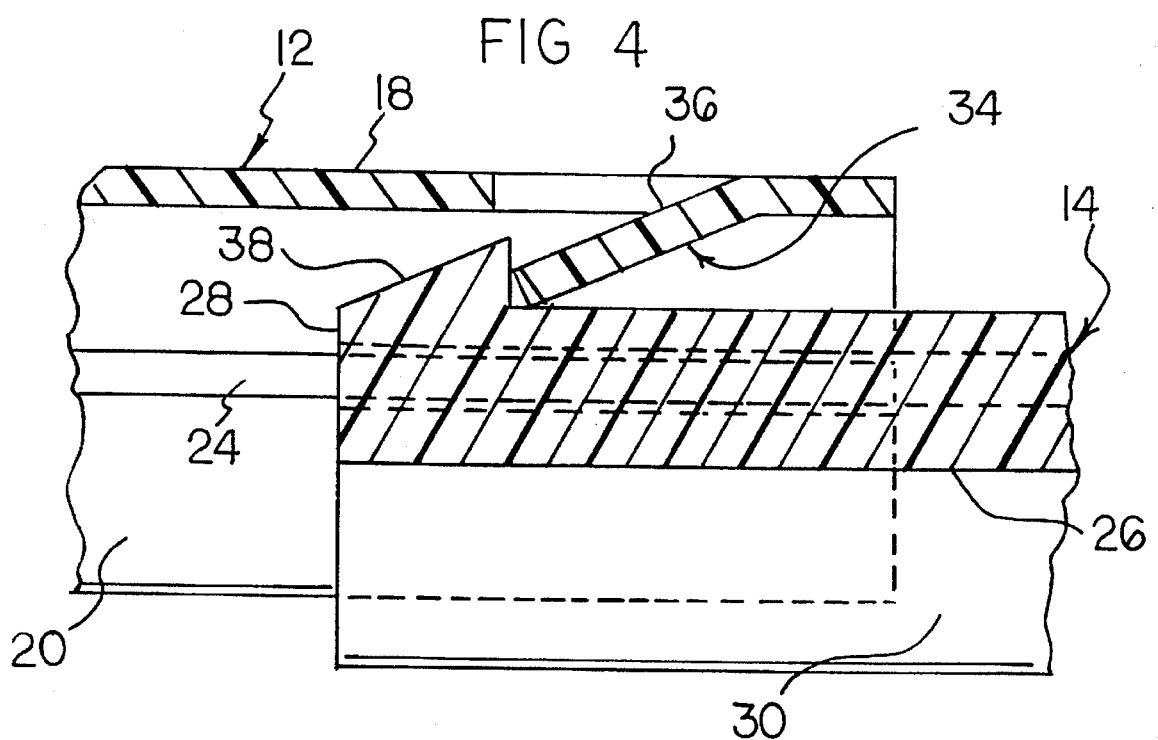
FIG. 4 is a cross sectional view taken along line 4—4 of FIG. 3.

Referring know to FIGS. 2 through 4 wherein the present invention 10 is illustrated in detail, it can be shown that the first member 12 of the present invention 10 preferably comprises an elongated planar first top wall 18 having substantially spaced and parallel longitudinal edges from which first lateral walls 20 project so as to reside in a substantially spaced and parallel orientation relative to one another. The first lateral walls 20 project from the planar first top wall 18 and each terminate in a lower longitudinal edge oriented so as to extend in a substantially spaced and parallel orientation relative to the respective longitudinal edge of the first top wall 18. The lower longitudinal edges of the first lateral walls 20 can be shaped so as to define enlarged lower edges 22 having a transverse thickness substantially greater than a transverse thickness of a majority of the first lateral walls. A pair of first longitudinal interior projections 24 extend from interior surfaces of the first lateral walls 20 and project towards one another so as to reside in a substantially spaced parallel orientation relative to the planar first wall top wall 18.

With continuing reference to FIG. 3, it can be shown that the second member 14 comprises an elongated planar second top wall 26 positioned between the first lateral walls 20 of the first member 12. A second T-shaped member 28 extends from an upper surface of the second top wall 26 of the second member 14 so as to reside between the first top wall 18 and the longitudinal interior projections 24 to slidably couple the second member 14 relative to the first member 12. Second lateral walls 30 project from respectively opposed longitudinal edges of the second top wall 26 and extend into a substantially spaced and parallel orientation relative to one another. The second lateral walls 30 each terminate in a lower longitudinal edge which is preferably shaped so as to define an enlarged lower edge 32 having a transverse dimension or thickness which is substantially greater than a thickness of a major portion of the second lateral wall 30.

As shown in FIGS. 1 and 4, the present invention 10 may further comprise a detent assembly 34 coupled to the first member 12 and engagable with the second member 14 for selectively securing the second member relative to the first member. To this end, and as shown in FIG. 4, the detent assembly 34 preferably comprises a detent tab 36 projecting downwardly from an interior surface of the planar first top wall 18 of the first member 12. A detent projection 38 extends upwardly from the T-shaped member 28 and operates to engage the detent tab 36 of the first member 12 so as to limit sliding of the second member 14 relative thereto.

Figure 7:
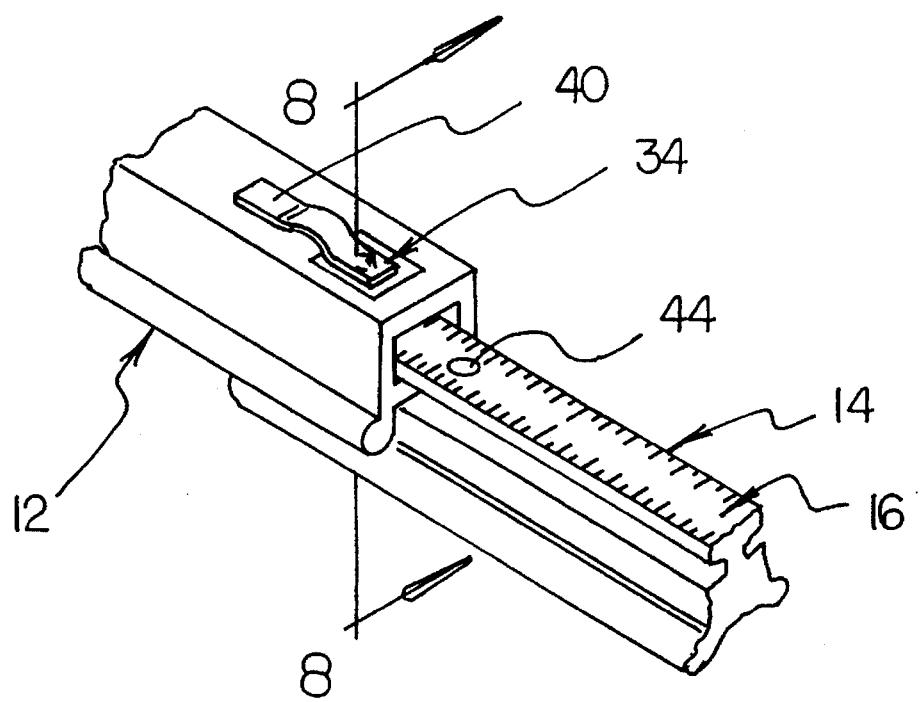
FIG. 7 is an enlarged isometric illustration of an alternative form of a detent assembly of the invention.
Figure 8:
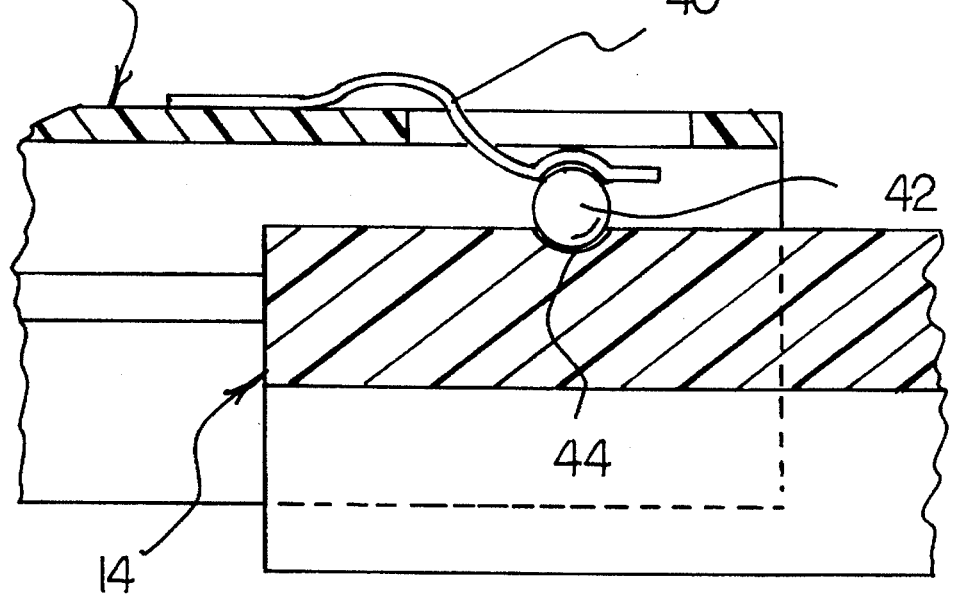
FIG. 8 is a cross sectional view taken along line 8—8 of FIG. 7.

Referring now to FIGS. 7 and 8, it can be shown that the detent assembly 34 may alternatively comprise a leaf spring 40 mounted to the first top wall 18 of the first member 12 and supporting a detent ball 42 in abutting engagement with an upper surface of the T-shaped member 28 of the second member 14. The upper surface of the T-shaped member 28 of the second member 14 is accordingly shaped so as to define at least one detent aperture 44 directed thereinto and positioned for reception of the detent ball 42. By this structure, the second member 14 can be selectively secured in a desired orientation relative to the first member 12 by a positioning of the detent ball 42 into a desired one of the detent apertures 44.

Figure 5:
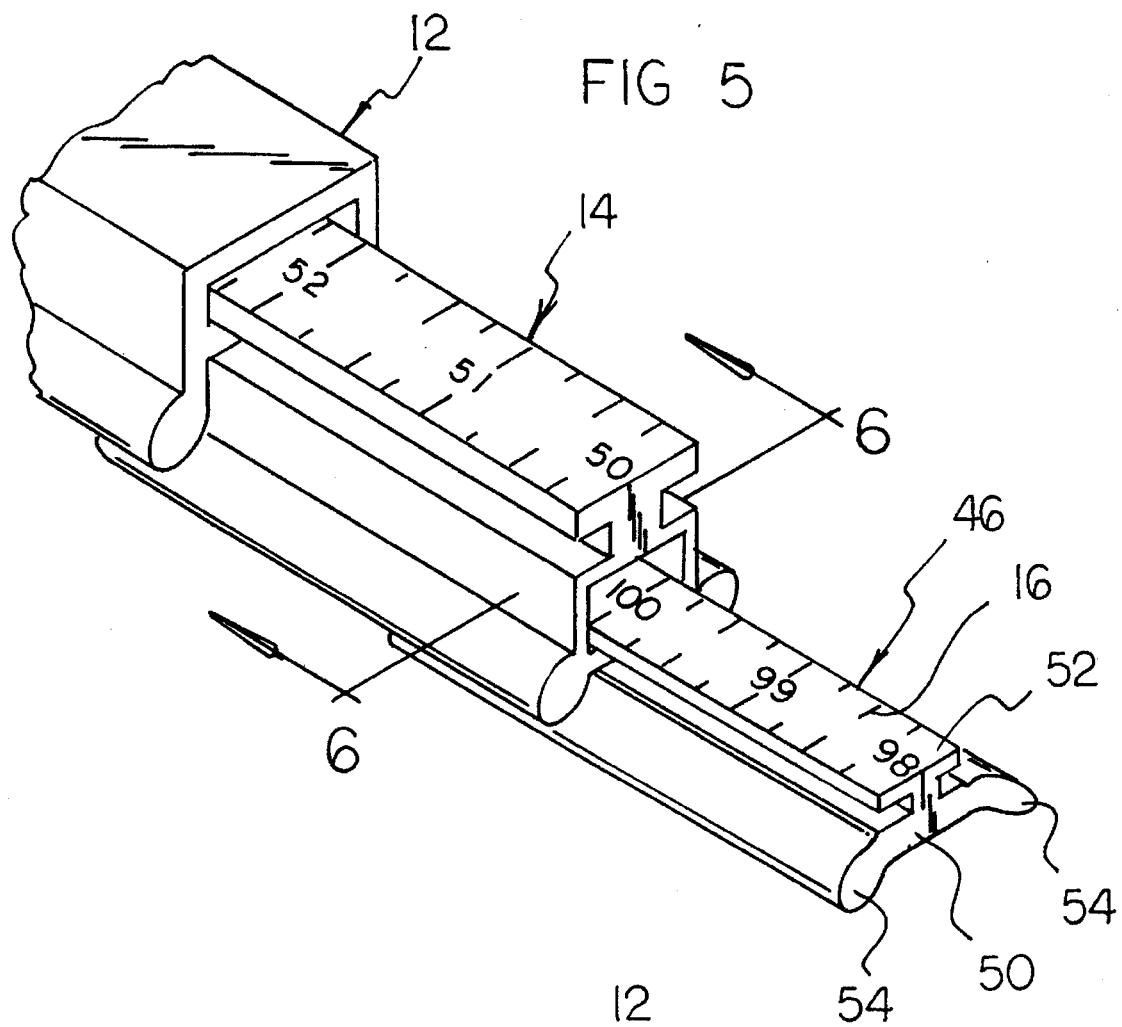
FIG. 5 is an enlarged isometric illustration of the present invention including a third member.
Figure 6:
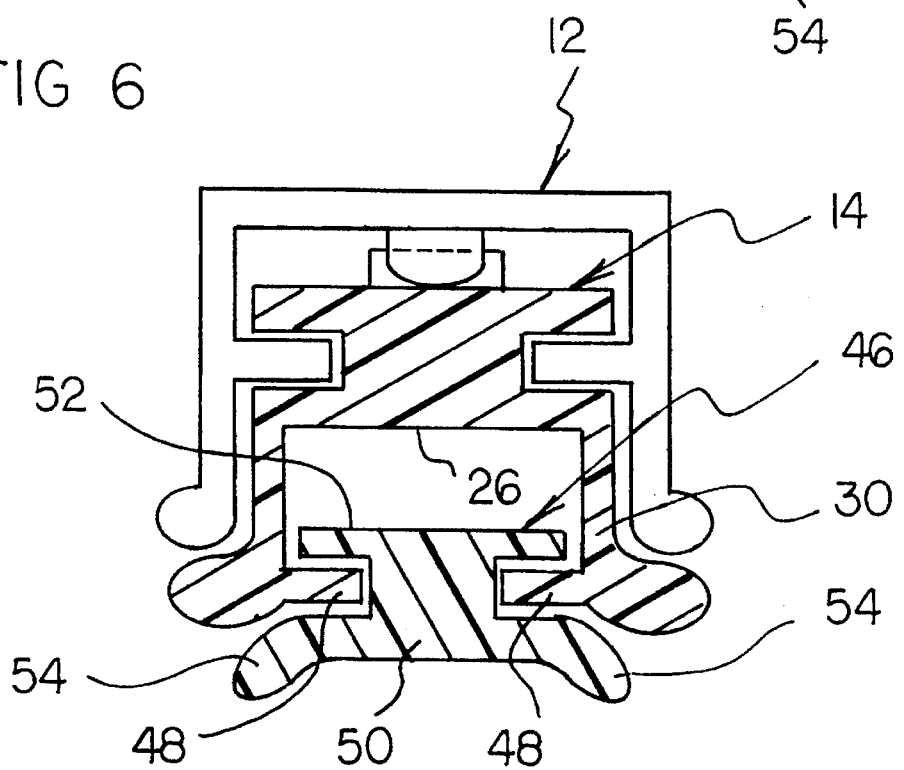
FIG. 6 is a cross sectional view taken along line 6—6 of FIG. 5.

Referring now to FIGS. 5 and 6, it can be shown that the present invention 10 may further comprise a third member 46 slidably telescopingly received at least partially within the second member 14. To this end, the second member 14 preferably additionally comprises second longitudinal interior projections 48 extending from interior surfaces of the second lateral walls and into a substantially spaced and parallel orientation relative to the second top wall 26. The third member 46 accordingly includes an elongated planar third top wall 50 having a third T-shaped member 52 projecting from an upper surface thereof so as to reside between the second longitudinal interior projection 48 and the second top wall 26 of the second member 14 so as to slidably couple the third member 46 relative thereto. Further, the third member 46 includes third lateral walls 54 extending from respectively opposed longitudinal edges of the third top wall 50. The third member 46 may also include measurement indicia 16 printed thereon substantially as shown in FIG. 5 which starts at a known length of a sum of the first and second members and can be read at an intersection of the second and third members to ascertain an overall length of the device when situated between two spaced objects. By this structure, the present invention 10 can measure lengths substantially greater than a combined length of the second member 14 and the first member 12 as described above.

The members 12, 14, and 46 of the telescoping measuring device 10 can be provided in any desired length or lengths including, but not limited to, a range from approximately fourteen inches long to approximately fifty inches long.

In use, the telescoping measuring device 10 according to the present invention can be easily utilized for measuring a distance between two spaced objects. The present invention 10 can be easily collapsed into a compact configuration for storage and/or transportation purposes wherein the second member 14 is received within the first member 12, and the third member is slidably received within the second member 14.

As to a further discussion of the manner of usage and operation of the present invention shown in the figures, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A telescoping measuring device comprising:

an elongated first member;

an elongated second member slidably received at least partially within the first member;

measurement indicia printed along the second member which can be interpreted relative to the first member to indicate an overall length of the device read at an intersection of the first and second members so as to indicate a distance between an end of the first member and an end of the second member;

wherein the first member comprises an elongated planar first top wall having substantially spaced and parallel longitudinal edges from which a first pair of lateral walls project so as to reside in a substantially spaced and parallel orientation relative to one another, the first pair of lateral walls projecting from the planar first top wall and each terminating in a lower longitudinal edge oriented so as to extend in a substantially spaced and parallel orientation relative to the respective longitudinal edge of the first top wall; and a pair of longitudinal interior projections extending from interior surfaces of the first pair of lateral walls and projecting towards one another so as to reside in a substantially spaced and parallel orientation relative to the planar first top wall, with the second member extending between the pair of first longitudinal interior projections and the planar first wall top wall;

wherein the lower longitudinal edges of the first pair of lateral walls are shaped so as to define enlarged lower edges having a transverse thickness substantially greater than a transverse thickness of a majority of the first pair of lateral walls;

wherein the second member comprises an elongated planar second top wall positioned between the first lateral walls of the first member; a T-shaped member extending from an upper surface of the second top wall of the second member so as to reside between the first top wall and the longitudinal interior projections to slidably couple the second member relative to the first member; a second pair of lateral walls projecting from respectively opposed longitudinal edges of the second top wall and extending into a substantially spaced and parallel orientation relative to one another, the second pair of lateral walls each terminating in a lower longitudinal edge which is preferably shaped so as to define an enlarged lower edge having a transverse thickness which is substantially greater than a thickness of a major portion of the second pair of lateral walls;

a fixed detent assembly coupled to the first member and engagable to the second member for precluding the second member from separating from the first member;

wherein the fixed detent assembly comprises a detent tab projecting downwardly from an interior surface of the planar first top wall of the first member; a detent projection extending upwardly from the T-shaped member and operating to engage the detent tab of the first member so as to preclude the sliding of the second member outwardly thereof.

* * * * *